United States Patent Office 2,890,368
Patented June 9, 1959

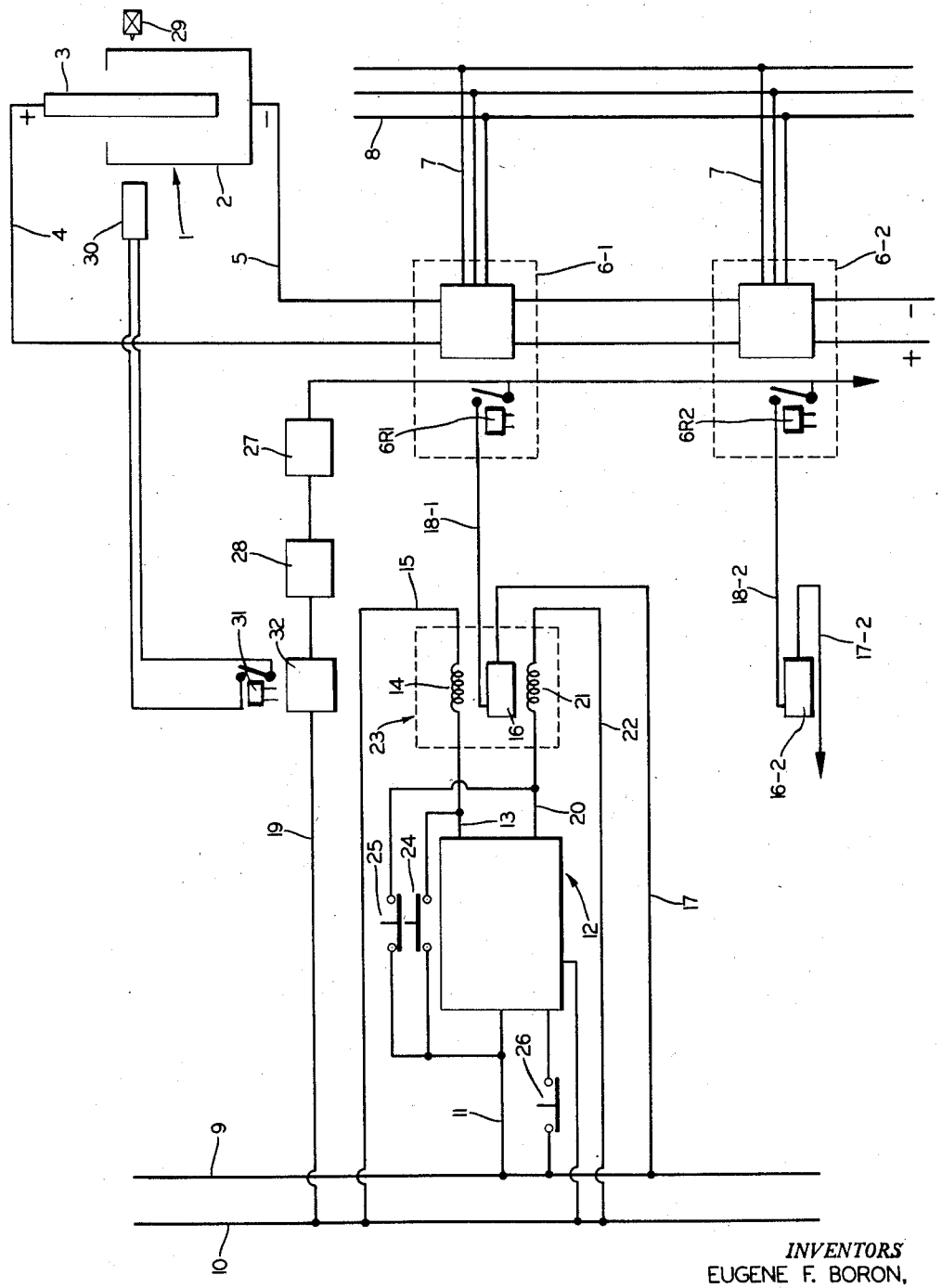

2,890,368

CONTROLLED CONSUMABLE ELECTRODE ARC MELTING FURNACE CONSTRUCTION AND OPERATION

Eugene F. Boron, Niles, and William H. Gorga, Champion, Ohio, and John A. Grubisa, Bessemer, Pa., assignors to Mallory-Sharon Metals Corporation, a corporation of Delaware Application October 24, 1957, Serial No. 692,096

8 Claims. (Cl. 314—59)

The invention relates to the arc melting of metals, and more particularly to the controlled melting of metals in a consumable electrode arc furnace by which any melting procedure for any particular metal or alloy may be consistently reproduced and by which uniformly-the-same ingots of any particular metal or alloy may be successively produced having the same quality, size, weight, etc.

It is important in the melting of titanium and titanium alloys to form ingots, that the procedure and the resulting ingots formed shall be capable of consistant reproduction. That is, it is advantageous for innumerable reasons that all ingots of any particular composition shall be as nearly identical as possible so that any one ingot is the same as any other ingot not only from the standpoint of quality, size, and weight, but also in respect of metal structure, properties and characteristics in the bottom, body, top and skin of the ingot as well as surface condition thereof. Where such uniformity can be maintained and uniformly-the-same ingots can be consistently produced in accordance with accurately controlled melting procedures, such ingots will have uniform characteristics and properties from ingot to ingot which will enable desired uniform finished or semi-finished products to be rolled or otherwise formed therefrom with a maximum yield and minimum costs.

The production of titanium and titanium alloy ingots having sound bottoms, sound tops with a minimum of skull, and side walls having skin surfaces with a minimum of surface defects requiring grinding, dressing or other surface preparation for subsequent forging or rolling operations is dependent upon a number of related variables and conditions.

Among others, these variables include the rate of melting the metal supplied from a consumable electrode in an arc melting furnace immediately after the arc is struck for forming the bottom zone of the ingot; the rate of melting as the ingot metal is being deposited after the bottom ingot zone has been formed for forming the main body portion of the ingot; and the rate of melting as the formation of the top end of the ingot is completed. The variables also include the time during which a particular power supply rate is maintained during each melting stage.

The consumable electrode arc melting procedure in melting titanium and titanium alloys to form ingots is carried out either under vacuum conditions or in an argon atmosphere and in a closed chamber wherein the metal melted from the consumable electrode at the arc is deposited and quickly cools and solidifies in a water-cooled, usually copper, crucible or ingot mold which forms the bottom of the closed furnace chamber and the other pole of the arc struck from the lower end of a consumable electrode suspended within such mold or crucible.

The indicated variables in times and rates of melting during each of the melting stages are controlled by or dependent upon the power input of the furnace during each of such melting stages.

These variables and the optimum melting procedure utilized may differ slightly or substantially depending upon the particular composition of titanium or titanium alloy being melted. Ordinarily, the optimum procedure for any particular material can only be established by trial and error. However, once the optimum melting procedure and conditions for any particular composition have been established, it then becomes vital in the economic production of titanium and titanium alloy ingots to exactly reproduce the established optimum melting procedure in the melting of all ingots of the selected composition without errors which may be introduced in carrying out a melting operation incident to human frailties by the manual control of the melting procedure.

Prior to the invention there has been no means available by which the melting procedure carried out in melting a selected composition could be accurately and consistently reproduced. Heretofore, furnace controls though operating through the medium of electrical and mechanical devices have been actuated manually to a large degree. An attempt is made with such manual operation to conform to the optimum procedure established for the selected composition being melted. However, variations, even though slight, are encountered in manual operation, in the rates of supplying power to the furnace and the lengths of time that power at any particular level is supplied during each of the various melting stages.

Such variations, even though slight, may cause differences in the characteristics of the resulting ingots. In order to obtain consistently uniform results the power to the furnace must be controlled on a schedule measured in seconds or even fractions thereof.

Thus, once a furnace is placed in operation for a particular melt, the power supply must be such as to initiate the arc, attain a predetermined voltage and maintain this voltage throughout the melting cycle, build up power as the bottom of the ingot is being formed, maintain the high level of power for a predetermined length of time until an ingot of selected size has been melted, then reduce power input until the proper ingot top structure has been achieved when the power will be cut off. In this manner sameness of quality, size and weight for each ingot of any selected composition may be achieved.

*Example I*

For example, a consumable electrode arc furnace for melting titanium or titanium alloys may use an 18" consumable electrode to form a 24" ingot and for one selected composition may require a D.C. power input of 2,000 amperes at 40 volts to strike the arc. Once the arc has been established, the current should be increased rapidly, say, in increments of 1,000 amperes every thirty seconds or 2,000 amperes per minute until, say, 10,000 amperes are supplied. Under such control, a sound bottom for the ingot can be formed.

After the 10,000-ampere power level has been achieved, such power supply must be maintained at the high level for, say, 1¼ hours in order to melt and deposit the metal and rapidly build up the ingot body which solidifies progressively upward in the water-cooled crucible with side surfaces having a minimum of defects.

When the ingot of the proper and predetermined size has been formed by the high-level power supply maintained during the 1¼ hour period, the current input must be reduced at a controlled rate until all power is cut off so that a sound top portion for the ingot is formed.

Equipment for such power supply essentially consists of a series of rectifiers, say, having a 1,000-ampere rating each, which are cut in and out of the power supply to the arc furnace with relays to satisfy the indicated requirements.

Such equipment must be capable of both manual and automatic control so that the optimum procedure for any particular material may be established and so that such established optimum procedure can be substantially reproduced; and also so that any furnace can be cut off at any time in case of emergency.

In accordance with the invention, the rectifiers are controlled by relays which are actuated automatically to connect the necessary number of rectifiers in parallel in the power supply for the furnace at the times and for the time intervals necessary to reproduce the melting procedure for the selected composition.

In Example I, two 1000-ampere rectifiers are connected initially in the circuit to strike the arc. Immediately after the arc is struck, an additional rectifier is added to the circuit. Then another rectifier is added to the circuit every thirty seconds until a sufficient number are connected in the line to supply 10,000 amps.

The 10,000-ampere power supply is then maintained for the 1¼-hour period, and the rectifiers are then cut out of the power supply one or more at a time until all power input ceases.

The foregoing procedure in the operation of relays to control the rectifiers may be controlled by a timing mechanism which closes and opens contactors for operating the relays in accordance with the exact optimum procedure established.

*Example II*

The optimum melting procedure for melting another selected composition may require three 1000-ampere rectifiers to be connected initially in the furnace circuit to strike the arc. Immediately after the arc is established, two more 1000-ampere rectifiers are added to the power supply, and then full power operation is achieved utilizing a total of 29 rectifiers by adding one rectifier to the furnace supply line every thirty seconds in a total time of some twelve minutes. The furnace is then operated at full power for 1½ hours, at which time the power is cut back to approximately 10,000 amps. by removing one rectifier from the power supply every thirty seconds until some seventeen to nineteen rectifiers have been cut off to provide the desired 10,000 amps. power supply. Furnace operation is continued at 10,000 amps. to burn off the consumable electrode at this power level for fifteen minutes after which the remaining rectifiers are cut out of the power supply one or more at a time until all power input ceases.

*Example III*

The optimum melting procedure for melting still another composition may involve striking the arc with three 1000-ampere rectifiers in the line and adding two more rectifiers to the line as soon as the arc has been established. Then two additional rectifiers may be added to the line every thirty seconds in two increments, followed by adding one rectifier to the line every thirty seconds until a total of twenty-nine rectifiers are connected in the power supply for full-power operation which is then maintained for a period of 1¾ hours.

At this time, the power supply is cut back to 10,000 amps. by removing one rectifier from the line every thirty seconds until some seventeen to nineteen rectifiers have been cut out to provide the desired 10,000 amps. power supply. At the 10,000-ampere power level, the consumable electrode will be burned off for fifteen minutes, whereupon the remaining rectifiers will be cut out of the power supply one or more at a time until all power input ceases.

*Example IV*

In some furnace operations, two complete consumable electrodes may be required to be melted in order to supply sufficient metal for the formation of one ingot, the first half of the ingot being formed from one consumable electrode, and the second half from a second consumable electrode.

With such procedure, for the first half of the ingot-forming operation, the arc may be struck with two rectifiers and one additional rectifier is added to the line as soon as the arc has been established. Then the power is built up to 10,000 amps. by adding one rectifier to the power supply every thirty seconds requiring a total of about five minutes. Melting is continued for 1¼ hours and the power then is shut off and the second electrode is located in place.

The arc is then struck with the second electrode using four rectifiers, and one additional rectifier is added as soon as the arc has been established. Full-power operation at 10,000 amperes must then be established by adding one rectifier to the line every thirty seconds, whereupon melting is continued at full-power operation for about 1¼ hours, and the rectifiers are then cut out of the power supply one or more at a time until all power input ceases.

*Example V*

In another example of forming one ingot from two consumable electrodes, the first half may be formed by striking the initial arc with two rectifiers and the addition of a third as soon as the arc is established. Melting proceeds by building up the power supply to 9,000 amperes in five minutes by adding two rectifiers to the line every thirty seconds, and the last four rectifiers to achieve full power at the rate of one every minute. With full-power operation the melting proceeds for 1½ hours, after which a second consumable electrode is placed in operation.

An arc is then struck for the second electrode with four rectifiers and the addition of one more as soon as the arc has been established. Full-power operation is then achieved by turning on one additional rectifier every thirty seconds until 9,000 amperes are being supplied and melting proceeds at full power for 1½ hours. The rectifiers are then cut out of the power supply one or more at a time until all power input ceases.

*Example VI*

As an example of procedure which may be utilized in forming a stainless steel ingot from consumable stainless steel electrodes, the initial arc may be struck with four 1000-ampere rated rectifiers. Thereafter, one more rectifier is added to the power supply to the furnace every minute until full power of 15,000 amps. has been established by a total of sixteen rectifiers on the line.

Operation of the furnace proceeds at full power for sixty-five minutes after which one rectifier is cut out of the line every thirty seconds until the power supply has been reduced to 5,000 amperes. Melting will continue at the 5,000-ampere level for five minutes to achieve the equivalent of hot-topping, whereupon the remaining rectifiers are cut out of the power supply one or more at a time until all power input ceases.

In the drawing, the manner in which a consumable electrode arc melting furnace may be controlled and operated in accordance with the invention is shown diagrammatically.

The consumable electrode arc melting furnace is indicated generally at 1 and may include a water-cooled crucible 2 and a consumable electrode 3. Power supply lines 4 and 5 are connected respectively with the electrode 3 and crucible 2 whereby an arc may be established between the lower end of the electrode 3 and the bottom of the crucible 2 initially, and thereafter with the pool of molten metal deposited by burning off the lower end of the electrode 3.

Power supply lines 4 and 5 are connected in parallel with a series of rectifiers 6–1, 6–2, etc. There may be any desired number of rectifiers for any particular furnace, depending upon the size or rated capacity of the furnace, such as 30 to 40 rectifiers, each having a rated 1000-ampere output. Two rectifiers 6–1 and 6–2 are shown in the drawing as representative of the total number provided.

Each rectifier may be connected by line wires 7 with a source of 440-volt, 3-phase, 60-cycle A.C. power supply indicated by the line wires 8. The rectifiers 6–1, 6–2, etc. are constructed so as to convert the alternating current power from line 8 to, say, 40-volt direct current power supplied to furnace line wires 4 and 5. Although the rectifiers 6–1, 6–2, etc. may each have a 1000-ampere rating, after use, their efficiency may be impaired somewhat so that the actual output may be somewhat less than 1000 amperes for each rectifier, and accordingly eleven rectifiers, for example, may be required to supply approximately 10,000 amperes to the furnace 1.

Each rectifier 6–1, 6–2, etc. is controlled by a relay, designated as 6R1, 6R2 in the drawings for cutting each rectifier into or out of the furnace power line 4—5.

For simplicity, the operation and control of one of the rectifier relays 6R1 will be described since all rectifier relays are controlled and operated in the same manner.

A control circuit power supply line is indicated by line wires 9 and 10 which may be a 110-volt, single-phase, 60-cycle A.C. power supply. Wire 11 may be connected to control circuit line wire 9 and to a central operating panel generally indicated at 12. This central operating panel 12 may be an "IBM Type-656–14 Electronic Central Operation Panel No. 633,705," the details of construction of which form no part of the present invention and which comprises a unit of equipment known to the art.

The central control panel 12 includes a timing mechanism having the required number of contactor actuators. The control panel 12 also includes a set of two contactors for each rectifier. One of the control panel contactors for each rectifier is a "start" contactor, and the other a "stop" contactor. When the "start" contactor in the control panel 12 for rectifier 6–1 is actuated, a circuit is closed from wire 11 to wire 13 through a coil 14 and wire 15 to control circuit power supply line 10. When "start" coil 14 is energized the contacts 16 are closed thereby, establishing a closed circuit from control circuit line wire 9 through wire 17, contactor 16, wire 18–1, rectifier relay 6R1 and wire 19 to control circuit line wire 10 thus actuating rectifier relay 6R1 to cut rectifier 6–1 into the power supply line to the furnace 1.

When the "stop" contactor for rectifier 6–1 in central panel 12 is actuated by the timer, a circuit is established from wire 11 to wire 20, coil 21, wire 22 to control circuit supply line 10. When "stop" coil 21 is energized, contacts 16 are opened which opens the circuit to rectifier relay 6R1 thereby cutting rectifier 6–1 out of the power supply line to the furnace 1.

Coils 14 and 21 and contacts 16 and the connections thereto may comprise an "IBM Type-4053 Electronic Dual Coded Latch Relay" generally indicated at 23 in the drawing and which also comprises a unit of equipment known in the art. One coded latch relay 23 is provided for each rectifier.

A set of "start" and "stop" manual control push buttons 24 and 25 may be connected in parallel with the central panel 12, for each rectifier. The "start" push button 24 may be actuated to energize coil 14 for manually cutting the rectifier 6–1 into the furnace supply line; and the "stop" push button 25 may be actuated to energize coil 21 to cut rectifier 6–1 out of the furnace power supply line. Thus, each rectifier may be manually controlled by its set of manual control push buttons 24 and 25, or the rectifier may be controlled by the central operation panel 12 when placed in operation to automatically carry out a melting procedure.

The rectifier relay 6R2 is wired and controlled in identically the same manner as described in connection with the rectifier relay 6R1. That is, rectifier relay 6R2 will have a circuit connection—19, 6R2, 18–2, 16–2, 17–2—with control circuit power supply line 9 and 10 identical with circuit—19, 6R1, 18–1, 16, 17—; and the contacts 16–2 therein will be actuated by another set of contactors in the control panel 12 which establish "start" or "stop" circuits through another set of coils 14 and 21 in another coded latch relay 23 provided for the rectifier relay 6R2.

All rectifiers provided, which may be 30 or 40 in number, for the power supply to furnace 1 are operated and controlled in the same manner, each having a rectifier relay such as 6R1 or 6R2, a coded latch relay 23, and a set of control panel contactors in the central control panel 12.

The various sets of control panel contactors in central control panel 12 are actuated in accordance with the particular program or optimum melting procedure required for the selected material being melted. This program is set up on the replaceable contactor actuators incorporated in the timing mechanism so that the "start" and "stop" contactors of each pair for each rectifier are actuated at the required time for cutting such rectifier into or out of the power supply 4—5 for furnace 1.

In operation, the improved furnace control arrangement may be used for establishing the optimum melting procedure for a selected composition by actuating the manual control "start" and "stop" push buttons 24 and 25. Thus, the "start" push buttons 24 are first operated for each of the required number of rectifiers necessary to strike the arc. Immediately after the arc is established, the "start" push button 24 for one or more additional rectifiers is actuated. Then the "start" buttons 24 for additional rectifiers are actuated at the selected rate in order to build up full power supply to the furnace 1 within the initial melting stage during which the bottom portion of the ingot is being formed. Then the furnace continues to operate with full power until the formation of an ingot of desired size has been substantially completed. Then "stop" buttons 25 are actuated to remove rectifiers from the power supply line at the desired rate until the top end of the ingot has been formed in the desired manner when all rectifiers will be cut out of the power supply to the furnace.

Having once determined the optimum melting procedure or program for any particular material, this program is set up on the actuators in the central control panel 12 for actuating the pairs of contactors for each rectifier. Such programming setup may be incorporated in removable parts for the central control panel which parts for any selected optimum procedure will be placed in operative position in the control panel for production runs of the furnace 1 to produce ingots of the selected material for which the program has been provided.

When the central control panel 12 is set up and the furnace 1 ready to operate, the operation is initiated by a timer run-reset switch 26 turned to the "run" position for the timer in the central control panel 12, whereupon the operation of the furnace 1 will proceed automatically in accordance with the setup program for the particular material being melted, until an ingot has been melted in and has solidified in the crucible 2 of furnace 1. At this time, the run-reset switch 26 is turned to "reset," the crucible is removed from the furnace, and the ingot stripped therefrom and the crucible is again placed in operative position on the furnace whereupon another melt can be made substantially exactly reproducing the earlier melt by starting the operation of the timer in the central control panel 12.

If at any time during automatic operation of the furnace, some unforeseen event occurs requiring cessation of furnace operation, this may be accomplished by manually pressing an emergency stop button, later described, for all rectifiers operatively connected in the furnace power supply circuit, which will immediately cut such rectifiers out of the power supply circuit.

In the operation of a furnace such as the furnace 1 for producing titanium ingots, various protective devices must be provided. Thus, when the furnace is operating, certain pit and vault doors for the furnace installation must be closed and a rolling door communicating directly with the outside atmosphere must be open for protection against explosion hazards. Similarly, the pressure and temperature of the water cooling system for the electrode holder as well as the pressure and temperature of the water cooling system for the crucible 2 must be established at the proper level. Also, the electrode holder shaft must be located in proper position with respect to the furnace and the water level in the crucible cooling system must be at a certain location.

Such protective devices or means may each include limit switch means which are closed when the proper condition has been established, such as a closed pit or vault door, an open rolling door, proper pressures and temperatures and water levels of cooling water for the electrode holder and crucible, etc.

These limit switches may be in series in a protective circuit with a protective relay which controls all of the rectifier relay circuits. Such protective relay when the protective circuit is closed may operate a protective contactor 27 in line 19 which connects all of the rectifier relay circuits. Thus, the power supply to furnace 1 cannot be turned on if the proper protective conditions do not exist, and the power to the furnace will be cut off if the proper protective conditions cease to exist.

An emergency stop contactor 28 also may be provided in line 19, which is opened by a relay actuated by an emergency stop button for instantly shutting down power to the furnace 1 in case of any emergency.

It is important, in the operation of the furnace 1, that any melting should cease whenever the molten pool in crucible 2 reaches a predetermined level. This protects the crucible against overfilling and protects the insulation against damage due to failure of some control or protective device.

For this purpose, a melt level detector may be provided consisting of a shielded source of gamma-ray radiation and a Geiger counter receiver. The source of gamma-ray radiation is indicated at 29 and is located at on side of the water-cooled crucible 2 at the desired final melt level. The Geiger counter 30 is located at the opposite side of crucible 2 also at the desired final melt level.

When the level of the molten pool in crucible 2 rises so as to change the effective density of material forming the crucible and the molten pool therein, intervening between gamma-ray device 29 and Geiger counter 30, this change in density is detected and intercepts the gamma-ray beam, stopping operation of the Geiger counter. When Geiger counter 30 stops operating, relay 31 controlled thereby opens the level-detector contactor 32, also provided in line 19, connected to all of the rectifier relay circuits, thus shutting down power to the furnace 1.

In the foregoing description, the invention has been described in detail with reference to the production of ingots of titanium or titanium alloys. However, the production of ingots of metals other than titanium and titanium alloys is contemplated, for example zirconium and stainless and alloy steels, an example for the production of stainless steel ingots being set forth above.

It has been found that many advantages are achieved in the production of stainless steel ingots using consumable electrode arc melting furnaces of the type described. Where the manufacture of stainless steel ingots is carried out in accordance with the invention, uniformity in ingot production may be achieved realizing substantial increases in yield and extremely uniform quality material from ingot to ingot and throughout each ingot.

Accordingly, whenever the melting of any metals or alloys is referred to herein, such terms are intended to include any metals or alloys which may be melted in a consumable electrode arc furnace.

Furthermore, although the invention has been described in detail with reference to a particular type of consumable electrode arc melting furnace, the many advantages which may be achieved by the use of the improved control construction and procedure are also applicable to other types of consumable electrode melting furnaces, which are included where the term "consumable electrode arc furnace" is used herein.

To summarize, the present invention provides for the controlled melting of metals in a consumable electrode arc furnace by which any melting procedure for any particular metal or alloy may be consistently reproduced and by which uniformly-the-same ingots of any particular metal or alloy may be successively produced having the same quality, size, weight, characteristics and properties.

Thus, the improved furnace control construction and operation enable the melting of ingots of selected composition in accordance with an optimum melting procedure and without errors in or variations from the rate of power supply at particular stages of melting and the time interval during which the power at any particular level is supplied during each of the various melting stages.

In this manner, numerous advantages are achieved and difficulties eliminated which have been inherent in the prior inability to maintain uniformity and high quality consistently in the production of ingots, particularly of high-cost metals such as titanium, zirconium and alloys thereof, as well as stainless steel; and a maximum yield at minimum cost of ingots produced is obtained. These high yield, low cost and uniform high quality results in turn apply to the semi-finished and finished products produced from the ingots, ultimately resulting in substantially lower over-all production costs.

In the foregoing description, certain terms have been used for brevity, clearness and understanding, but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example, and the scope of the present invention is not limited to the exact details illustrated or to the specific examples given.

Having now described the features, discoveries and principles of the invention, the operation and procedures of preferred method steps thereof, the construction and operation of the improved controlled consumable electrode arc melting furnace arrangement and the advantageous, new and useful results obtained thereby; the new and useful methods, steps, operations, procedures, discoveries, principles, combinations, subcombinations, constructions and elements, and mechanical equivalents obvious to those skilled in the art, are set forth in the appended claims.

We claim:

1. Consumable electrode arc furnace control construction including a crucible, a consumable metal electrode, an electrode-crucible power supply circuit, a plurality of rectifiers for supplying power to said circuit to establish and maintain an arc in the crucible for melting electrode metal to form an ingot in the crucible, each rectifier including a control relay to cut such rectifier into and out of said electrode-crucible power supply circuit; mechanical and electrical programmed timing and control mechanism operatively connected with all said control relays to automatically selectively actuate said relays in accordance with a preset program to cut a predetermined number of rectifiers into the power supply circuit at a predetermined rate to strike and maintain an arc until predetermined full power is supplied to the furnace, to maintain such rectifiers in said circuit to supply said predetermined full power for a predetermined time interval, and to cut said rectifiers out of the power supply circuit at a predetermined rate after said predetermined time interval has elapsed; and means for initiating automatic operation of said mechanism.

2. The construction defined in claim 1 also including manually operable means to actuate each control relay independently of said mechanism.

3. Consumable electrode arc furnace control construction including a crucible, a consumable metal electrode, an electrode-crucible power supply circuit, a plurality of rectifiers for supplying power to said circuit to establish and maintain an arc in the crucible for melting electrode metal to form an ingot in the crucible, each rectifier including a control relay to cut such rectifier into and out of the electrode-crucible power supply circuit, means connected with a predetermined plurality of said relays to initially actuate said predetermined plurality of relays to cut their respective rectifiers into the power supply circuit to strike an arc between the electrode and crucible, means operable as soon as the arc has been struck operatively connected with other control relays to actuate said other control relays to cut a predetermined number of additional rectifiers at timed intervals into the power supply circuit at a predetermined rate to build up predetermined full power in said supply circuit, means for maintaining all said cut-in rectifiers in the supply circuit for a predetermined time interval, and means for cutting selected rectifiers at timed intervals out of said supply circuit at a predetermined rate after said predetermined time interval has elapsed.

4. Consumable electrode arc furnace control construction including a crucible, a consumable metal electrode, an electrode-crucible power supply circuit, a plurality of rectifiers for supplying power to said circuit to establish and maintain an arc in the crucible for melting electrode metal to form an ingot in the crucible, each rectifier including a control relay to cut such rectifier into and out of the electrode-crucible power supply circuit, means connected with a predetermined plurality of said relays to initially actuate said predetermined plurality of relays to cut their respective rectifiers into the power supply circuit to strike an arc between the electrode and crucible, means operable as soon as the arc has been struck operatively connected with other control relays to actuate said other control relays to cut a predetermined number of additional rectifiers at timed intervals into the power supply circuit at a predetermined rate to build up predetermined full power in said supply circuit, means for maintaining all said cut-in rectifiers in the supply circuit for a predetermined time interval, means for cutting selected rectifiers at timed intervals out of said supply circuit at a predetermined rate after said predetermined time interval has elapsed until a predetermined lower power level is supplied to said supply circuit, means for maintaining said lower power supply level for a second predetermined time interval, and means for cutting remaining rectifiers at timed intervals out of said supply circuit at a predetermined rate after said second predetermined time interval has elapsed until all rectifiers are cut out of said supply circuit.

5. The construction defined in claim 4 in which the means connected with a predetermined plurality of relays includes a control circuit for each relay, and furnace protective device means connected in series in each control circuit.

6. The method of controlling the operation of a consumable electrode arc melting furnace to consistently reproduce a predetermined melting procedure for a selected metal whereby uniformly similar ingots of such selected metal may be successively produced, which includes the steps of providing a power supply for the furnace power circuit adapted to be increased by predetermined similar amperage increments, initially supplying a predetermined amperage to said power circuit to strike an arc in said furnace, automatically supplying additional amperage to said power circuit in predetermined amperage increments at timed intervals and at a predetermined rate as soon as the arc has been struck until predetermined full power is supplied to said power circuit, automatically maintaining said full power supply for a predetermined time interval, and then automatically reducing said power supply to said power circuit at the end of said interval in predetermined amperage increments at timed intervals and at a predetermined rate.

7. The method of controlling the operation of a consumable electrode arc melting furnace to consistently reproduce a predetermined melting procedure for a selected metal whereby uniformly similar ingots of such selected metal may be successively produced, which includes the steps of providing a power supply for the furnace power circuit adapted to be increased by predetermined similar amperage increments, initially supplying a predetermined amperage to said power circuit to strike an arc in said furnace, automatically supplying additional amperage to said power circuit in predetermined amperage increments at timed intervals and at a predetermined rate as soon as the arc has been struck until predetermined full power is supplied to said power circuit, automatically maintaining said full power supply for a predetermined time interval, then automatically reducing said power supply to said power circuit at the end of said interval in predetermined amperage increments at timed intervals and at a predetermined rate until a predetermined lower power level is supplied to said power circuit, automatically maintaining said lower level power supply for a second predetermined time interval, and then automatically further reducing said power supply to said power circuit after said second time interval has elapsed in pretermined amperage increments at timed intervals and at predetermined rate until all power supply to said power circuit has been cut off.

8. Consumable electrode arc furnace control construction including a crucible, a consumable metal electrode, an electrode-crucible power supply circuit, a plurality of rectifiers for supplying power to said circuit to establish and maintain an arc in the crucible for melting electrode metal to form an ingot in the crucible, each rectifier including a control relay to cut such rectifier into and out of said electrode-crucible power supply circuit; mechanical and electrical programmed timing and control mechanism operatively connected with all said control relays to automatically selectively actuate said relays in accordance with a preset program to cut a predetermined number of rectifiers into the power supply circuit at a predetermined rate to strike and maintain an arc until predetermined full power is supplied to the furnace, to maintain such rectifiers in said circuit to supply said predetermined full power for a predetermined time interval, and to cut said rectifiers out of the power supply circuit at a predetermined rate after said predetermined time interval has elapsed; means for initiating automatic operation of said mechanism; and means for interrupting the electrode-crucible power supply circuit when the molten pool of melted electrode metal in the crucible reaches a predetermined level in the crucible.

References Cited in the file of this patent

UNITED STATES PATENTS

| | | |
|---|---|---|
| 2,300,296 | Langabeer et al. | Oct. 27, 1942 |
| 2,434,494 | Meszaros et al. | Jan. 27, 1948 |
| 2,519,670 | Langabeer | Aug. 22, 1950 |